(12) United States Patent
Kowalchuk et al.

(10) Patent No.: US 10,820,464 B2
(45) Date of Patent: Nov. 3, 2020

(54) DEPTH ADJUSTMENT FEATURES FOR A SEED PLANTING UNIT OF AN AGRICULTURAL IMPLEMENT

(71) Applicant: CNH Industrial Canada, Ltd., Saskatoon (CA)

(72) Inventors: Trevor L. Kowalchuk, Saskatoon (CA); Gordon Anthony Engel, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 188 days.

(21) Appl. No.: 16/031,219

(22) Filed: Jul. 10, 2018

(65) Prior Publication Data

US 2020/0015403 A1 Jan. 16, 2020

(51) Int. Cl.
*A01B 63/00* (2006.01)
*A01B 63/22* (2006.01)
*A01C 5/06* (2006.01)

(52) U.S. Cl.
CPC ............ *A01B 63/008* (2013.01); *A01B 63/22* (2013.01); *A01C 5/062* (2013.01); *A01C 5/068* (2013.01)

(58) Field of Classification Search
CPC ..... A01B 63/008; A01B 63/002; A01B 63/00; A01B 63/22; A01B 63/16; A01B 63/14; A01C 5/062; A01C 5/06; A01C 5/00; A01C 5/068; A01C 5/066
See application file for complete search history.

(56) References Cited

U.S. PATENT DOCUMENTS

| | | |
|---|---|---|
| 3,658,133 A | 4/1972 | Sweet et al. |
| 4,031,963 A | 6/1977 | Poggemiller et al. |
| 4,077,478 A | 3/1978 | Neukom |
| 4,273,057 A | 6/1981 | Pollard |
| 4,413,685 A | 11/1983 | Gremelspacher et al. |
| 4,750,440 A | 6/1988 | Pollard et al. |
| 4,913,070 A | 4/1990 | Morrison, Jr. |
| 5,794,711 A | 8/1998 | Slattery |
| 6,644,223 B2 | 11/2003 | Prairie et al. |
| 6,935,253 B2 | 8/2005 | Murray et al. |
| 6,983,705 B1 | 1/2006 | Gust |
| 7,685,950 B2 | 3/2010 | Friesen |
| 8,047,147 B2 | 11/2011 | Harnetiaux |
| 8,235,134 B2 | 8/2012 | Schilling |
| 9,357,692 B2 | 6/2016 | Johnson et al. |
| 9,674,997 B2 | 6/2017 | Ryder et al. |
| 2012/0132116 A1 | 5/2012 | Beaujot et al. |
| 2017/0339819 A1 | 11/2017 | Kowalchuk et al. |

*Primary Examiner* — Christopher J. Novosad
(74) *Attorney, Agent, or Firm* — Rebecca L. Henkel; Rickard K. DeMille

(57) ABSTRACT

A seed planting unit of an agricultural implement may include a wheel support arm having an upper portion and a lower portion. A wheel may be rotatably supported by the lower portion of the wheel support arm, the wheel configured to contact the soil surface to define a penetration depth setting for the ground engaging tool relative to the soil surface. A depth stop member may be provided in operative association with one of the support structure or the wheel support arm. A depth adjustment member may be selectively movable relative to the other of the support structure or the wheel support arm to vary a relative distance between an abutment portion of the depth adjustment member configured to abut against the depth stop member and the other of the support structure or the wheel support arm to set the penetration depth setting for the ground engaging tool.

10 Claims, 14 Drawing Sheets

DEPTH ADJUSTMENT FEATURES FOR A SEED PLANTING UNIT OF AN AGRICULTURAL IMPLEMENT

FIELD OF THE INVENTION

The present subject matter relates generally to agricultural implements, and more specifically, to depth adjustment features for a seed planting unit of an agricultural implement.

BACKGROUND OF THE INVENTION

Generally, agricultural seed planting units are towed behind a tractor or other work vehicle via a mounting bracket secured to a rigid frame of an agricultural implement, such as a planter or seeder. These seed planting units typically include a ground engaging tool or opener that forms a furrow or seed planting trench for seed deposition into the soil. Specifically, the opener is used to break the soil to enable seed deposition. After the seed is deposited, the opener is followed by a packer wheel that packs the soil on top of the deposited seed. The packer wheel also serves to adjust the penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel, thereby, in turn, adjusting the penetration depth of the opener. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain agricultural implements have multiple seed planting units, and therefore have multiple openers (e.g., greater than 50, 60, 70, 80, 90, or more). Because the openers are typically configured to maintain the same penetration depth setting, the duration of the depth adjustment process is multiplied by the number of openers coupled to the implement. Consequently, reconfiguration of the implement for a different penetration depth setting may result in large delays in seeding operations, thereby decreasing seeding efficiency.

Accordingly, a seed planting unit for use within an agricultural implement that includes improved depth adjustment features for allowing more efficient reconfiguration of the depth settings of the implement's openers would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a seed planting unit of an agricultural implement, with the seed planting unit generally including a ground engaging tool configured to penetrate a soil surface, a support structure configured to support the ground engaging tool, a wheel support arm, and a wheel. The wheel support arm may be pivotally coupled to the support structure of the seed planting unit at a pivot point and may include an upper portion and a lower portion. The wheel may be rotatably supported by the lower portion of the wheel support arm and may be configured to contact the soil surface to define a penetration depth setting for the ground engaging tool relative to the soil surface. The seed planting unit may further include a depth stop member and a depth adjustment member. The depth stop member may be provided in operative association with one of the support structure or the wheel support arm. The depth adjustment member may generally include a base surface and define a plurality of levels disposed at varying distances relative to the base surface. The depth stop member may be configured to abut against a selected level of the plurality of levels when the wheel is contacting the soil surface to set the penetration depth setting for the ground engaging tool. The depth adjustment member may be configured to be selectively rotated relative to the other of the support structure or the wheel support arm to position the selected level for abutment with the depth stop member.

In another embodiment, the present subject matter is directed to an agricultural implement including a frame and a plurality of seed planting units supported by the frame, wherein the seed planting units may be configured to deposit seeds within a field as the implement is moved across the field. Each seed planting unit may generally include a ground engaging tool configured to penetrate a soil surface, a support structure configured to support the ground engaging tool, a wheel support arm pivotally coupled to the support structure, the wheel support arm including an upper portion and a lower portion, and a wheel. The wheel of each seed planting unit may be rotatably supported by the lower portion of the wheel support arm and be configured to contact the soil surface to define a penetration depth setting for the ground engaging tool relative to the soil surface. Each seed planting unit may further include a depth stop member provided in operative association with one of the support structure or the wheel support arm. Additionally, the depth adjustment member of each seed planting unit may include a base surface and define a plurality of levels disposed at varying distances relative to the base surface, wherein the depth stop member is configured to abut against a selected level of the plurality of levels when the wheel is contacting the soil surface to set the penetration depth setting for the ground engaging tool. Moreover, each depth adjustment member may be configured to be selectively rotated relative to the other of the support structure or the wheel support arm to position the selected level for abutment with the associated depth stop member.

In another embodiment, the present subject matter is directed to a seed planting unit of an agricultural implement, with the seed planting unit generally including a ground engaging tool configured to penetrate a soil surface, a support structure configured to support the ground engaging tool, a wheel support arm, and a wheel. The wheel support arm may be pivotally coupled to the support structure about a pivot point and may include an upper portion and a lower portion. The wheel may be rotatably supported by the lower portion of the wheel support arm and may be configured to contact the soil surface to define a penetration depth setting for the ground engaging tool relative to the soil surface. The seed planting unit may further include a depth stop member and a depth adjustment member. The depth stop member may be provided in operative association with one of the support structure or the wheel support arm while the depth adjustment member may be provided in operative association with the other of the support structure or the wheel support arm. The depth adjustment member may be configured to be selectively movable relative to the other of the support structure or the wheel support arm to vary a relative distance between an abutment portion of the depth adjustment member configured to abut against the depth stop member and the other of the support structure or the wheel support arm. The seed planting unit may further include a biasing member configured to apply a biasing force against the depth adjustment member to bias the portion of the depth adjustment member towards the other of the support structure or the wheel support arm. The depth stop member may be configured to selectively abut the abutment portion of the depth adjustment member when the wheel is contacting the soil surface to set the penetration depth setting for the ground engaging tool.

In a further embodiment, the present subject matter is directed to a seed planting unit of an agricultural implement, with the seed planting unit generally including a ground engaging tool configured to penetrate a soil surface, a support structure configured to support the ground engaging tool, a wheel support arm, and a wheel. The wheel support arm may be pivotally coupled to the support structure and may generally include an upper portion and a lower portion. The wheel may be rotatably supported by the lower portion of the wheel support arm, the wheel configured to contact the soil surface to define a penetration depth setting for the ground engaging tool relative to the soil surface. The seed planting unit may further include a depth stop member and a depth adjustment member. The depth stop member may be provided in operative association with one of the support structure or the wheel support arm while the depth adjustment member may be provided in operative association with the other of the support structure or the wheel support arm. The depth adjustment member may be configured to be selectively axially movable relative to the other of the support structure or the wheel support arm to vary a relative distance between an abutment portion of the depth adjustment member configured to abut against the depth stop member and the other of the support structure or the wheel support arm. The depth stop member may be configured to selectively abut the abutment portion of the depth adjustment member when the wheel is contacting the soil surface to set the penetration depth setting for the ground engaging tool.

In another embodiment, the present subject matter is directed to an agricultural implement including a frame and a plurality of seed planting units supported by the frame, seed planting units being configured to deposit seeds within a field as the implement is moved across the field. Each seed planting unit may generally include a ground engaging tool configured to penetrate a soil surface, a support structure configured to support the ground engaging tool, a wheel support arm pivotally coupled to the support structure, the wheel support arm including an upper portion and a lower portion, and a wheel. The wheel may be rotatably supported by the lower portion of the wheel support arm and be configured to contact the soil surface to define a penetration depth setting for the ground engaging tool relative to the soil surface. Each seed planting unit may further include a depth stop member provided in operative association with one of the support structure or the wheel support arm. Additionally, each seed planting unit may include a depth adjustment member provided in operative association with the other of the support structure or the wheel support arm. For each seed planting unit, the depth adjustment member may be configured to be selectively axially movable relative to the other of the support structure or the wheel support arm to vary a relative distance between an abutment portion of the depth adjustment member configured to abut against the depth stop member and the other of the support structure or the wheel support arm. Moreover, for each seed planting unit, the depth stop member may be configured to selectively abut the abutment portion of the depth adjustment member when the wheel is contacting the soil surface to set the penetration depth setting for the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
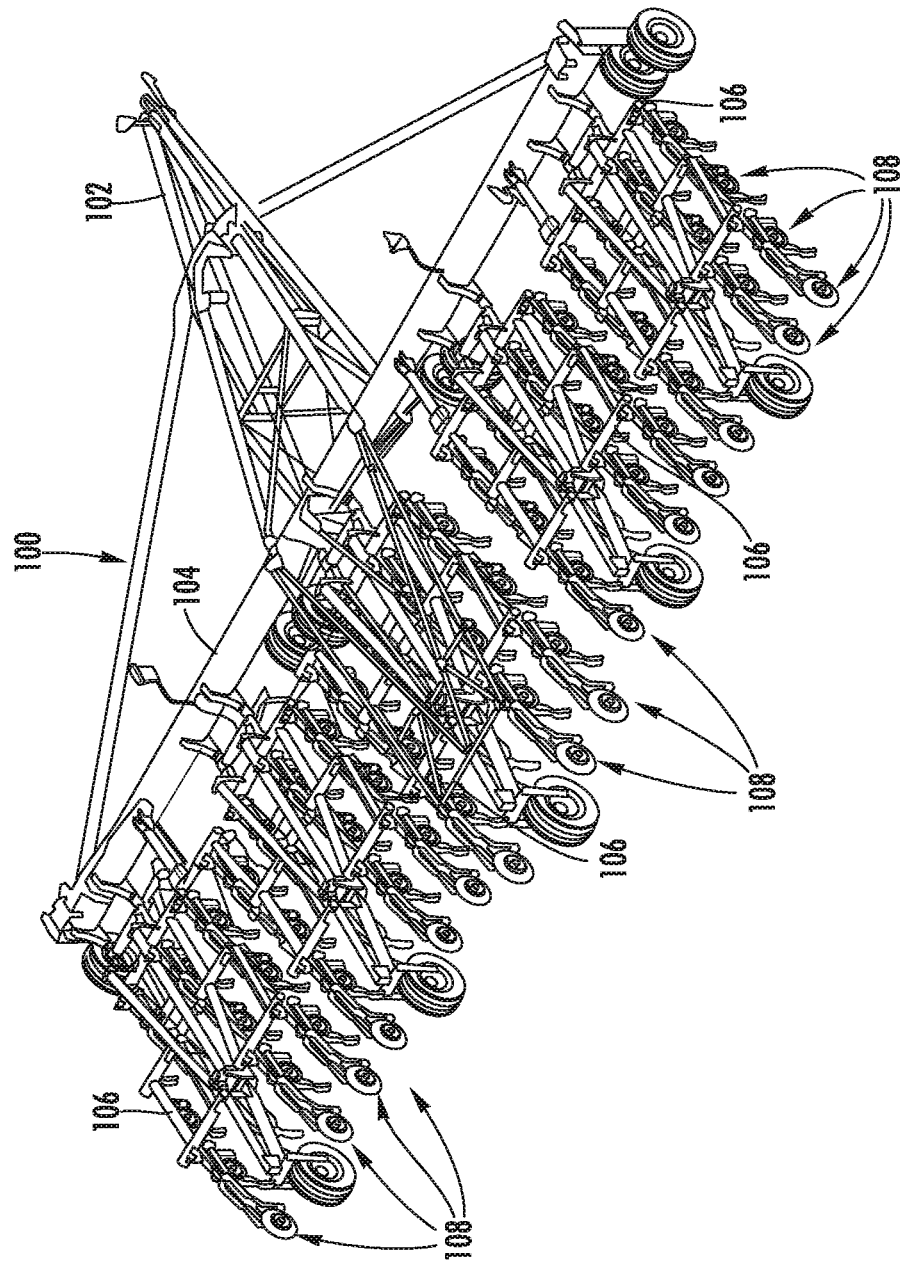
FIG. 1 illustrates a perspective view of one embodiment of an agricultural implement including multiple seed planting units in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a seed planting unit for an agricultural implement. In several embodiments, the implement may correspond to a planter or seeder and may include a plurality of seed planting units coupled to or otherwise supported by a frame of the planter/seeder. In one embodiment, each seed planting unit may include a ground engaging tool configured to open the soil surface to create a seed trench or furrow, and a wheel rotatably supported by a corresponding wheel support arm of the seed planting unit, with the wheel being configured to roll across or otherwise contact the soil surface to set a penetration depth of the ground engaging tool, as well as to close the seed trench upon deposition of seeds therein.

Additionally, in accordance with aspects of the present subject matter, each seed planting unit may be configured to allow a penetration depth setting for the ground engaging tool to be adjusted. Specifically, the seed planting unit may include one or more depth adjustment components and/or features configured to allow the vertical position of the wheel to be adjusted relative to the ground engaging tool, which, in turn, may result in a corresponding adjustment in the penetration depth setting. As such, the depth adjustment components(s) and/or feature(s) may be used to set the desired penetration depth for the ground engaging tool based on, e.g., the soil composition or seed type, to allow for more efficient and/or effective seeding operations.

In several embodiments, the seed planting unit may include a depth stop member in operative association with one of the support structure or the wheel support arm. Additionally, the seed planting unit may include a depth adjustment member configured to be selectively moved relative to the other of the support structure or wheel support arm to adjust the penetration depth for the ground engaging tool. The depth adjustment member may be configured to have an abutment portion and an elongated portion. Specifically, in one embodiment, the abutment portion may be configured to have a graduated profile positioned relative to a base surface, with the graduated profile defining a plurality of stepped surfaces or "levels". As will be described below, the depth stop member may be configured to abut against a selected level of the plurality of levels when the support structure is in a working position to set a penetration depth setting of the associated ground engaging tool. In such an embodiment, the depth stop member may be configured to be spaced apart from the depth adjustment member when the support structure is in an adjustment position such that the depth adjustment member may be rotatable relative to the support structure or wheel support arm (e.g., to adjust the penetration depth setting of the associated ground engaging tool). Moreover, in one embodiment, the various levels of the depth adjustment member may be spaced apart from its base surface by varying distances to allow the depth stop member to be held at differing discrete positions from the wheel support arm or the support structure, thereby permitting the penetration depth setting for the ground engaging tool to be similarly adjusted in incremental amounts corresponding to the difference in distances between adjacent levels of the depth adjustment member.

Additionally, in one embodiment, the base surface of the depth adjustment member may include a first plurality of engagement elements and the support structure or the wheel support arm may include a second plurality of engagement elements, the first plurality of engagement elements configured to engage the second plurality of engagement elements to limit or prevent movement of the depth adjustment member relative to the support structure or the wheel support arm.

In several embodiments, the seed planting unit may additionally include a biasing element or tightening element generally positioned against a side of the support structure or wheel support arm opposite the depth adjustment member. In such embodiments, the biasing or tightening element engages the depth adjustment member to limit or prevent movement of the depth adjustment member relative to the support structure or wheel support arm.

In another embodiment, the seed planting unit may include an actuator configured to adjust the position of the depth adjustment member relative to the support structure or wheel support arm. Specifically, the actuator may be configured to selectively actuate the depth adjustment member when the support structure is in the adjustment position such that the depth adjustment member may be moved relative to the support structure or wheel support arm, thereby permitting the penetration depth setting for the ground engaging tool to be adjusted automatically.

It should be appreciated that, in accordance with aspects of the present subject matter, the position of the depth adjustment member relative to the support structure or wheel support arm may be adjusted either manually or automatically to adjust the depth penetration setting for the ground engaging tool. For instance, in one embodiment, an operator may be allowed to manually adjust the positioning of the depth adjustment member (e.g., rotating and/or pulling the depth adjustment member). In another embodiment, as indicated above, the seed planting unit may include an electronically controlled actuator coupled to the depth adjustment member (e.g., a rotary motor). In such an embodiment, the actuator may be configured to be selectively controlled to actuate the depth adjustment member so as to move the member relative to the support structure or wheel support arm, thereby permitting the penetration depth setting for the ground engaging tool to be adjusted automatically.

In yet another embodiment, the base surface of the depth adjustment member may be configured to be spaced apart from the support structure or wheel support arm. For example, in one embodiment, one or more depth adjustment attachments may be configured to be attached to the elongated portion of the depth adjustment member between the base surface of the depth adjustment member and the support structure or the wheel support arm. In such a way, the depth stop member may be held at differing discrete positions from the wheel support arm, thereby permitting the penetration depth setting for the ground engaging tool to be similarly adjusted in incremental amounts corresponding to the combined thickness of the depth adjustment attachments.

Referring now to the drawings, FIG. 1 illustrates a perspective view of one embodiment of an agricultural implement 100. In general, the implement 100 is configured to be towed behind a work vehicle, such as a tractor (not shown). As shown in FIG. 1, the implement 100 may include a tow bar assembly 102, which is shown in the form of an A-frame hitch assembly. The tow bar assembly 102 may include a hitch configured to attach to an appropriate tractor hitch via a ball, clevis, or other coupling. Additionally, the tow bar assembly 102 may be coupled to a tool bar 104, which, in turn, supports multiple tool frames 106. Moreover, in several embodiments, each tool frame 106 may include multiple seed planting units 108, such as a plurality of hoe openers, coupled thereto or supported thereby. As discussed in detail below, each seed planting unit 108 may be configured to facilitate quick and efficient reconfiguration of the unit 108 for varying penetration depth settings in accordance with aspects of the present subject matter.

It should be appreciated that the configuration of the implement 100 described above and shown in FIG. 1 is provided only to place the present subject matter in an exemplary field of use. Thus, it should be appreciated that the present subject matter may be readily adaptable to any manner of implement configuration.

Figure 2:
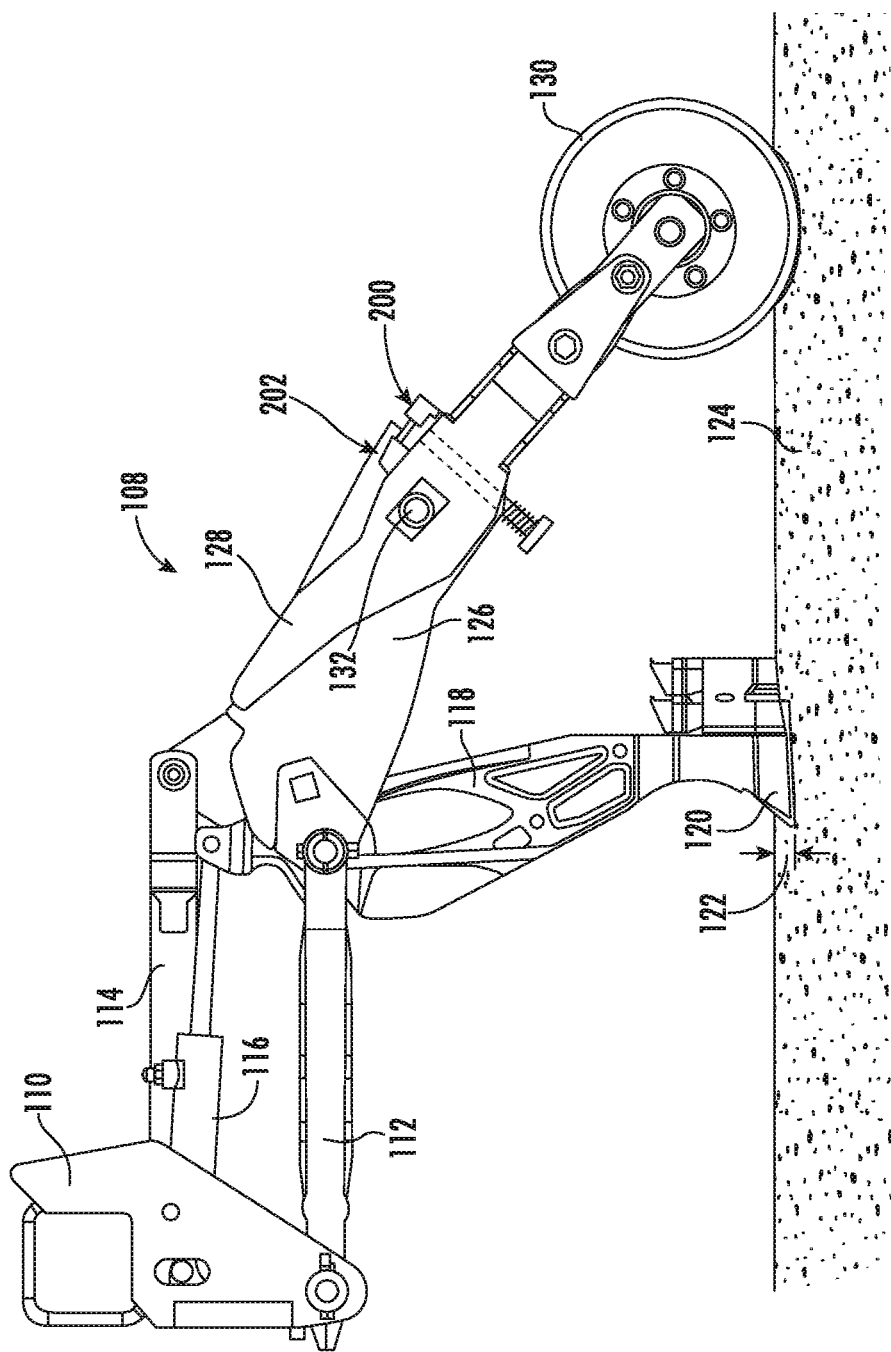
FIG. 2 illustrates a side view of one embodiment of a seed planting unit suitable for use within the agricultural implement shown in FIG. 1 in accordance with aspects of the present subject matter, particularly illustrating the seed planting unit including a depth stop member and an associated depth adjustment member for adjusting the penetration depth setting of a ground engaging tool of the unit.

Referring now to FIG. 2, a side view of one embodiment of a seed planting unit 108 suitable for use within an agricultural implement (e.g., the implement 100 shown in FIG. 1) is illustrated in accordance with aspects of the present subject matter, particularly illustrating the unit 108 including one embodiment of depth adjustment components or features configured to facilitate reconfiguration of the unit's penetration depth setting. It should be appreciated that, although the seed planting unit 108 is shown and described herein as corresponding to a hoe opener, the seed planting unit 108 may generally correspond to any suitable row unit having any suitable configuration that facilitates the deposition of seeds within the soil. Additionally, it should be appreciated that, although the seed planting unit 108 will generally be described in the context of the implement 100 shown in FIG. 1, the unit 108 may generally be configured to be installed on any suitable implement having any suitable implement configuration.

As shown in FIG. 2, the seed planting unit 108 includes a mounting bracket 110, a first linkage member 112, a second linkage member 114, and a biasing device or actuator, such as a cylinder 116 (e.g., hydraulic and/or pneumatic piston-cylinder assembly). In one embodiment, the cylinder 116 may be hydraulically coupled to a power supply that provides a flow of pressurized hydraulic fluid which displaces a piston rod extending from the cylinder. The mounting bracket 110 and associated hardware are generally configured to interface with the tool frame 106 (FIG. 1), thereby securing the seeding planting unit 108 to the implement 100 (FIG. 1). For instance, multiple seed planting units 108 may be mounted in parallel along the tool frame 106 (FIG. 1) to form a seeding assembly or unit. In the illustrated embodiment, the first linkage member 112, the second linkage member 114, and the mounting bracket 110 generally form elements of a parallel linkage, also known as a four bar linkage. As will be appreciated, components of the seed planting unit 108, such as the mounting bracket 110 (and associated hardware), first linkage member 112, and second linkage member 114, may be made of any suitable material, such as steel. It should be appreciated that, in other embodiments, any other suitable linkage(s) or linkage assembly may be used to couple the seed planting unit 108 to the tool frame 106. For example, in an alternative embodiment, only one of the linkage members 112, 114 may be used to couple the seed planting unit 108 to the frame 106, such as configuring a single linkage for use in a trailing arm opener design.

As is illustrated in FIG. 2, the cylinder 116 may be attached to a shank 118 either directly, e.g., via a pin at the end of the piston rod, or indirectly, e.g., via a swing link or other linkage coupled between the shank 118 and the cylinder 116. A ground engaging tool, such as the illustrated opener 120, is also attached to the shank 118 and is configured to engage the soil. Contact force between the opener 120 and the soil establishes a moment about a shank pivot joint. This moment is resisted by the force applied to the shank 118 by the cylinder 116. Furthermore, the linkage is configured to facilitate vertical movement of the implement 100, while maintaining the opener 120 at a desired penetration depth setting 122 within the soil 124. The desired penetration depth setting 122 may be selected based on soil conditions, or environmental factors, among other considerations. As illustrated, the linkage is coupled to a wheel support structure, such as the illustrated support structure 126.

A wheel support arm 128, including a packer wheel 130, is pivotally coupled to the support structure 126 by a pin 132 disposed through openings within the wheel support arm 128 and the support structure 126. The pin 132 is generally positioned at an interface between an upper portion 134 and a lower portion 136 of the wheel support arm 128. The packer wheel 130 is rotatably coupled to the lower portion 136 of the wheel support arm 128 and is configured to roll along or otherwise contact the soil surface to both pack the soil on top of deposited seeds and limit the penetration depth setting 122 of the opener 120. The pin 132 enables rotation of the wheel support arm 128 with respect to the support structure 126. However, in a working mode, rotation of the wheel support arm 128 relative to the support structure 126 is blocked by selective contact between a depth adjustment member 200 and a depth stop member 202 of the seed planting unit 108.

As discussed in detail below, in one embodiment, the depth adjustment member 200 is configured to be rotatable relative to the wheel support arm 128 when it is desired to adjust the penetration depth setting 122 of the opener 120. Specifically, in such an embodiment, the depth adjustment member 200 is configured to define an abutment portion against which the depth stop member 202, operatively associated with the support structure 126, may abut or contact during the working mode to limit rotation of the wheel support arm 128. Additionally, the abutment portion may define a graduated profile relative to a base surface. As such, movement of the depth adjustment member 200, and its associated graduated profile, relative to the wheel support arm 128 may therefore adjust a distance between the depth stop member 202 and the wheel support arm 128 through which the depth stop member 202 will contact the graduated profile during the working mode. Once a desired penetration depth setting 122 has been established, the depth adjustment member 200 may be locked into position relative to the wheel support arm 128, thereby limiting rotation of the wheel support arm 128 and enabling the seed planting unit 108 to enter the working mode. As previously discussed, the packer wheel 130 rotates across the surface of the soil to limit the penetration depth setting 122 of the opener 120. Consequently, the difference in vertical position between the packer wheel 130 and the opener 120 defines the penetration depth setting 122 of the opener 120 within the soil 124.

Figure 3:
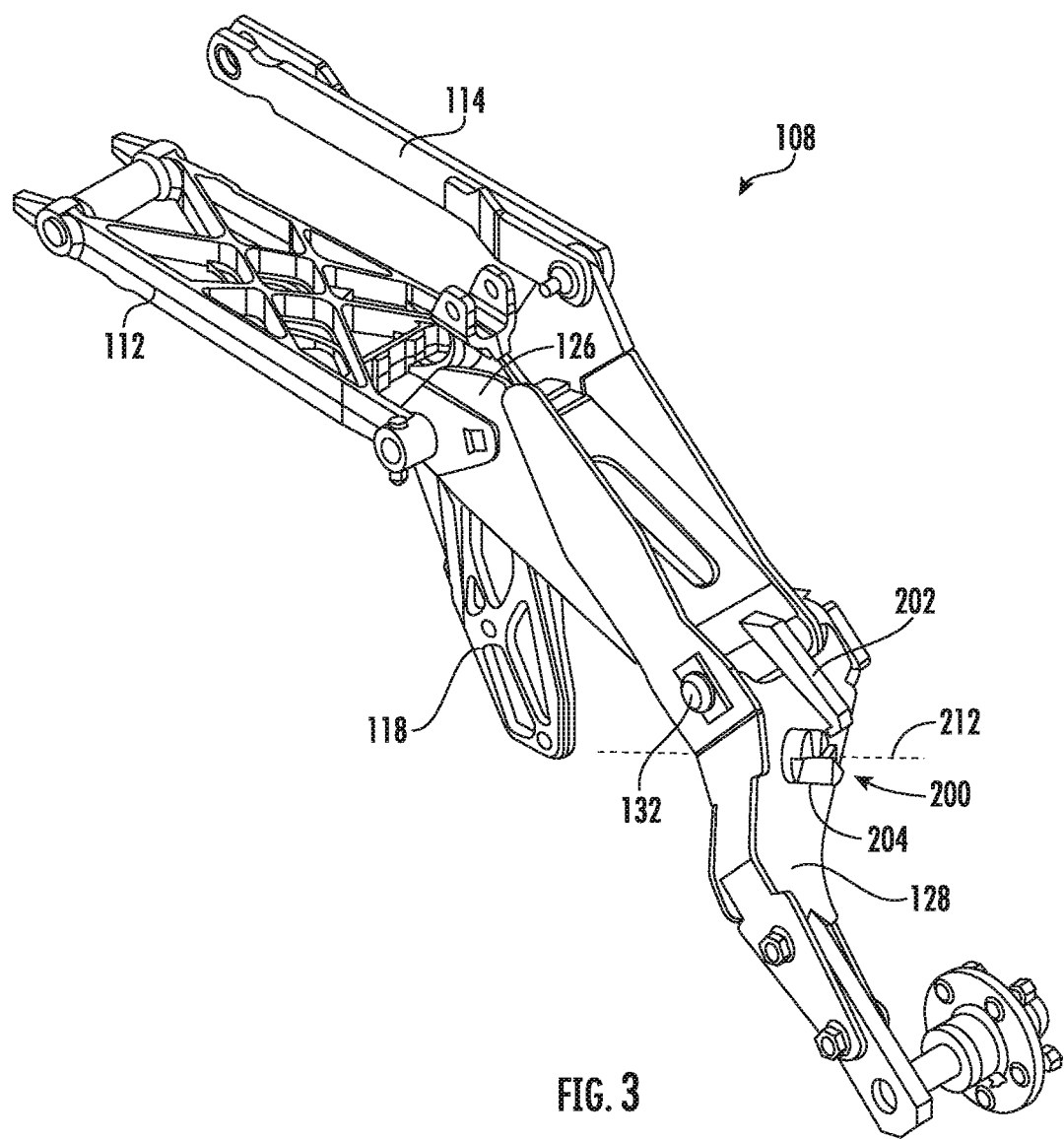
FIG. 3 illustrates a partial, perspective view of the seed planting unit shown in FIG. 2 with various components of the unit, including a packer wheel and a portion of the ground engaging tool, removed for purposes of illustration, particularly illustrating aspects of a support structure, a wheel support arm, the depth stop member and the depth adjustment member of the seed planting unit in accordance with aspects of the present subject matter.
Figure 4:
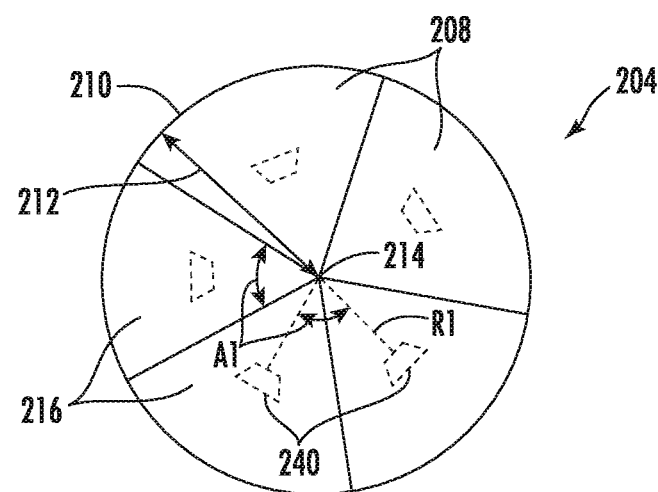
FIG. 4 illustrates a top view of the depth adjustment member of the seed planting unit shown in FIG. 3 in accordance with aspects of the present subject matter.
Figure 5:
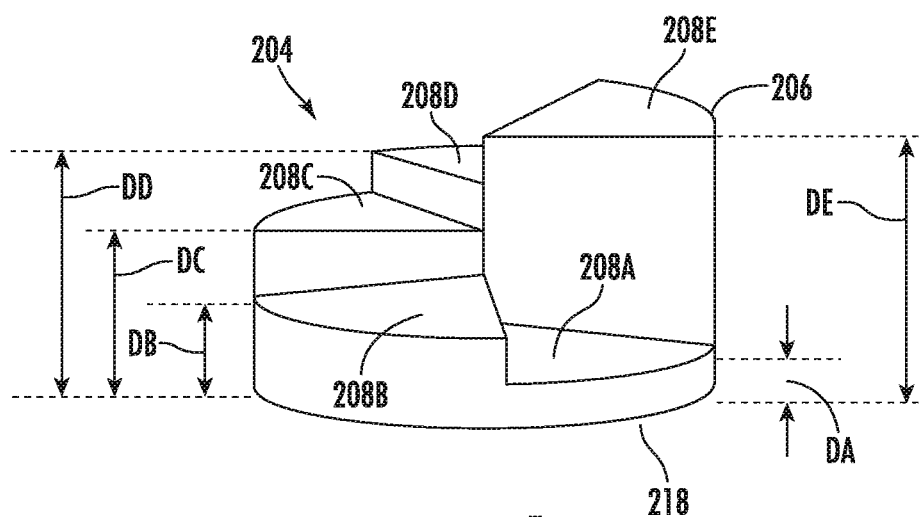
FIG. 5 illustrates a partial, perspective view of the depth adjustment member of the seed planting unit shown in FIG. 2 in accordance with aspects of the present subject matter.
Figure 6:
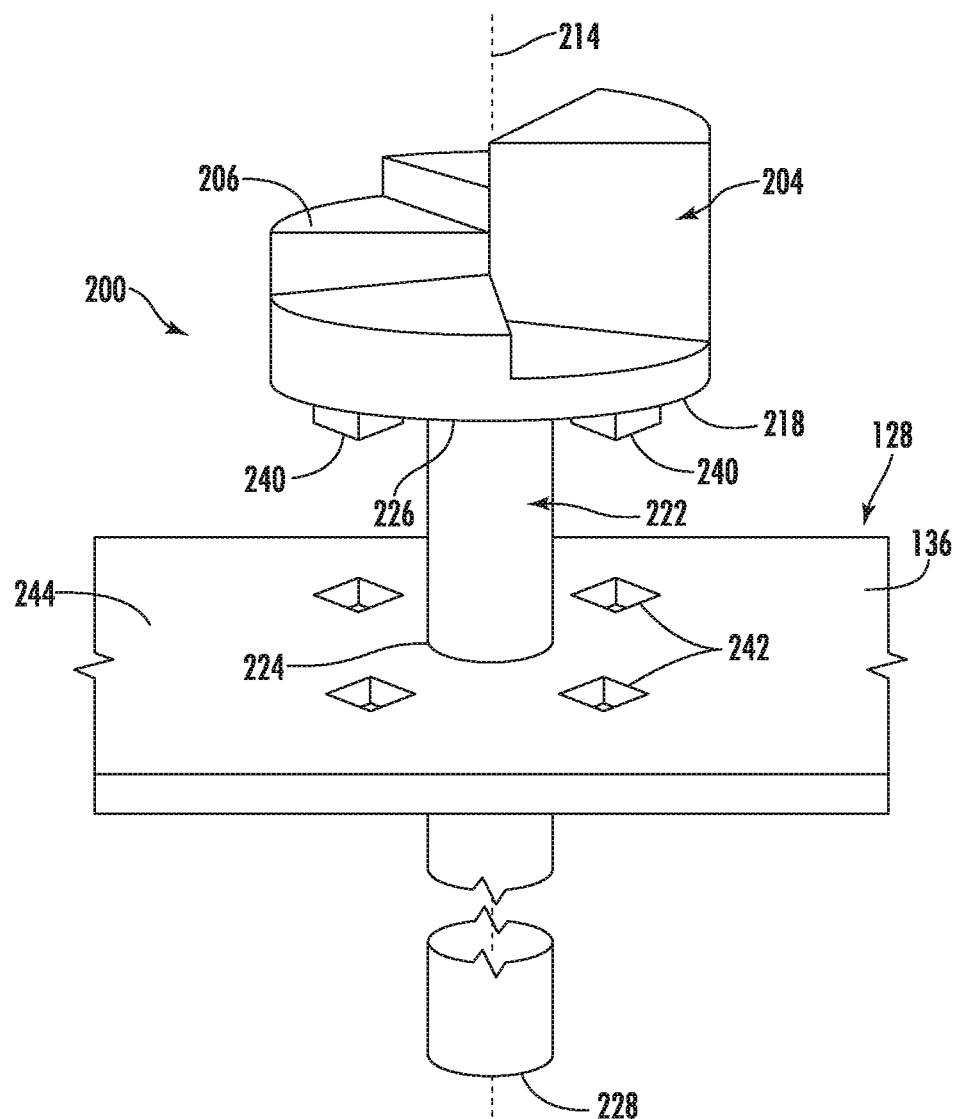
FIG. 6 illustrates a partial, perspective view of the depth adjustment member positioned relative to the wheel support arm of the seed planting unit shown in FIG. 3 in accordance with aspects of the present subject matter, particularly illustrating the depth adjustment member partially exploded away from the wheel support arm.
Figure 7:
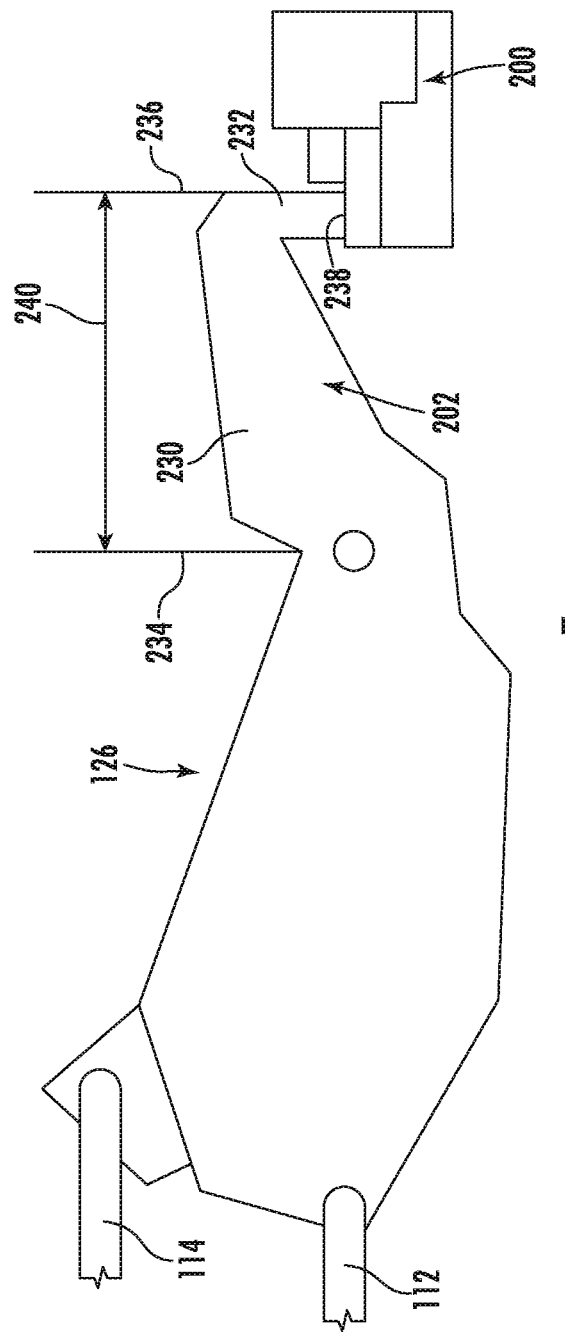
FIG. 7 illustrates a partial, side view of the seed planting unit shown in FIG. 2, particularly illustrating the depth stop member positioned relative to the depth adjustment member.
Figure 8:
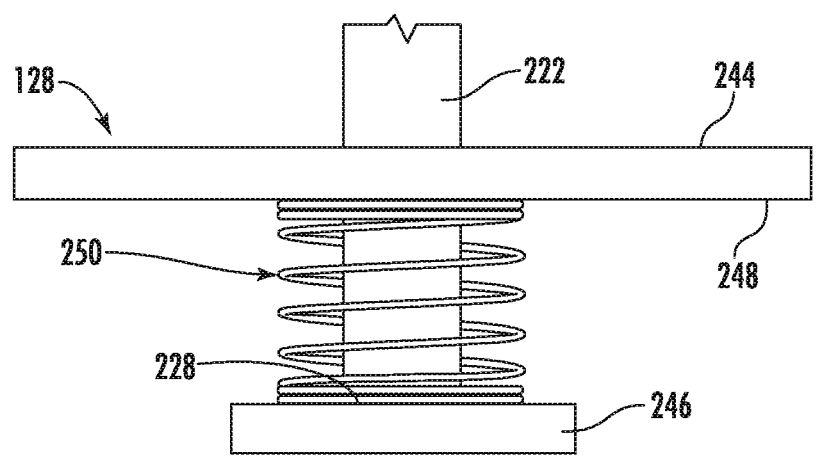
FIG. 8 illustrates a partial, side view of the depth adjustment member as installed relative to the wheel support arm of the seed planting unit shown in FIG. 2 in accordance with aspects of the present subject matter, particularly illustrating features for selectively locking the depth adjustment member relative to the wheel support arm.
Figure 9:
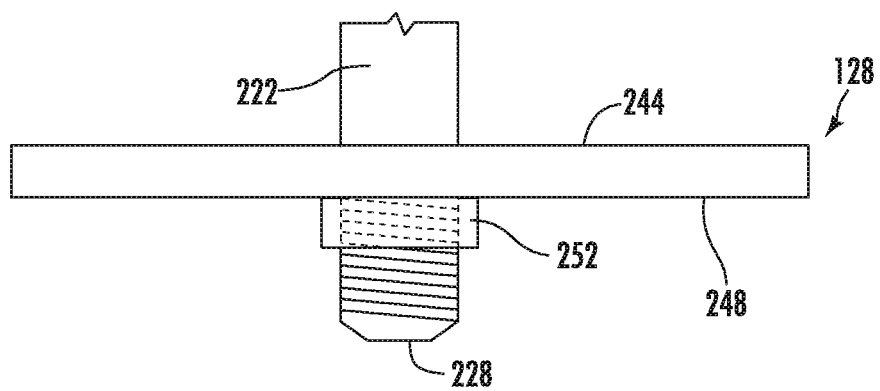
FIG. 9 illustrates a partial, side view of the depth adjustment member as installed relative to the wheel support arm of the seed planting unit shown in FIG. 2 in accordance with aspects of the present subject matter, particularly illustrating alternative features for selectively locking the depth adjustment member relative to the wheel support arm.
Figure 10:
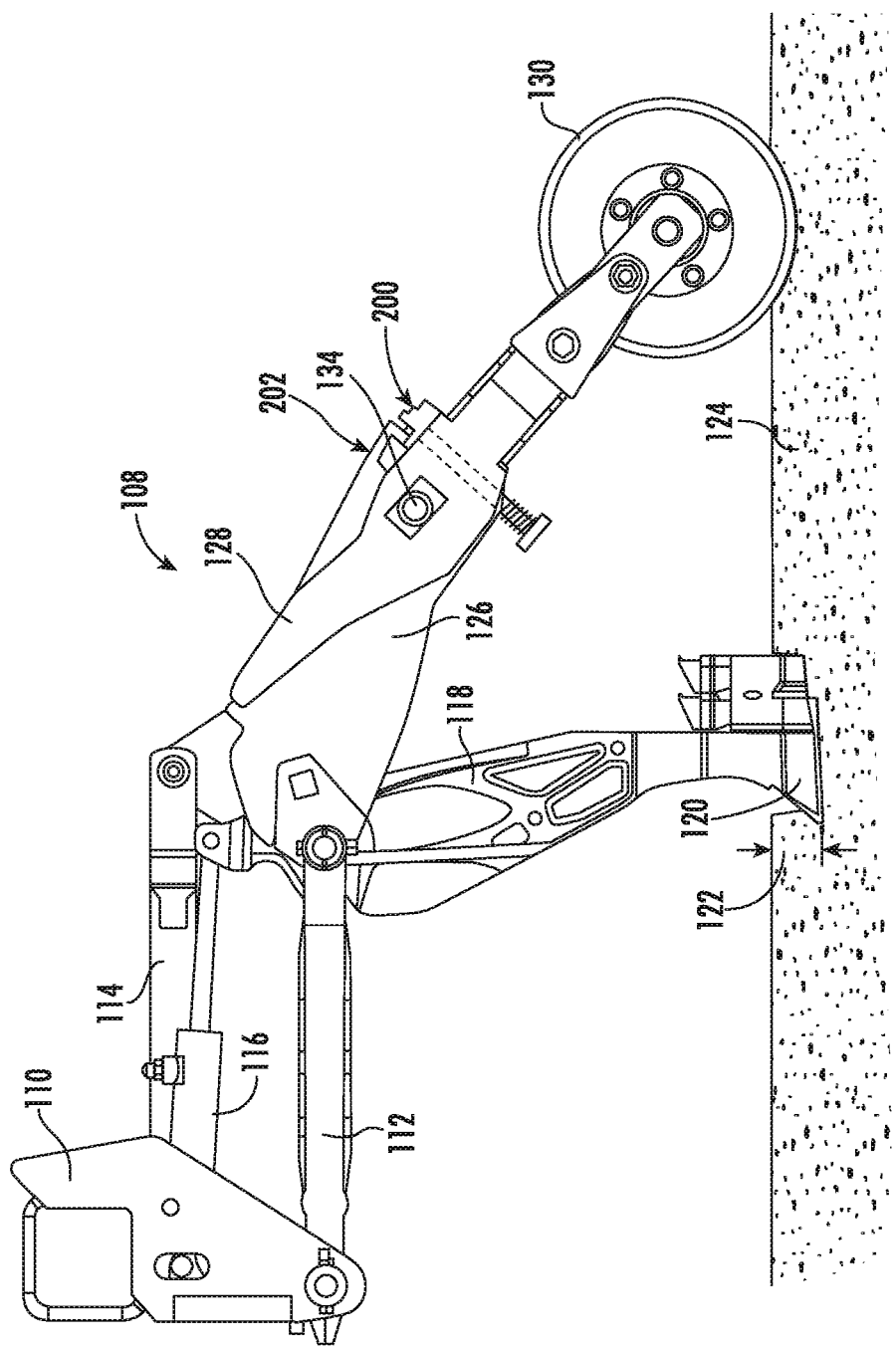
FIG. 10 illustrates a side view of the seed planting unit shown in FIG. 2, particularly illustrating the depth adjustment member positioned relative to the wheel support arm such that the ground engaging tool is disposed at its maximum penetration depth setting.
Figure 11:
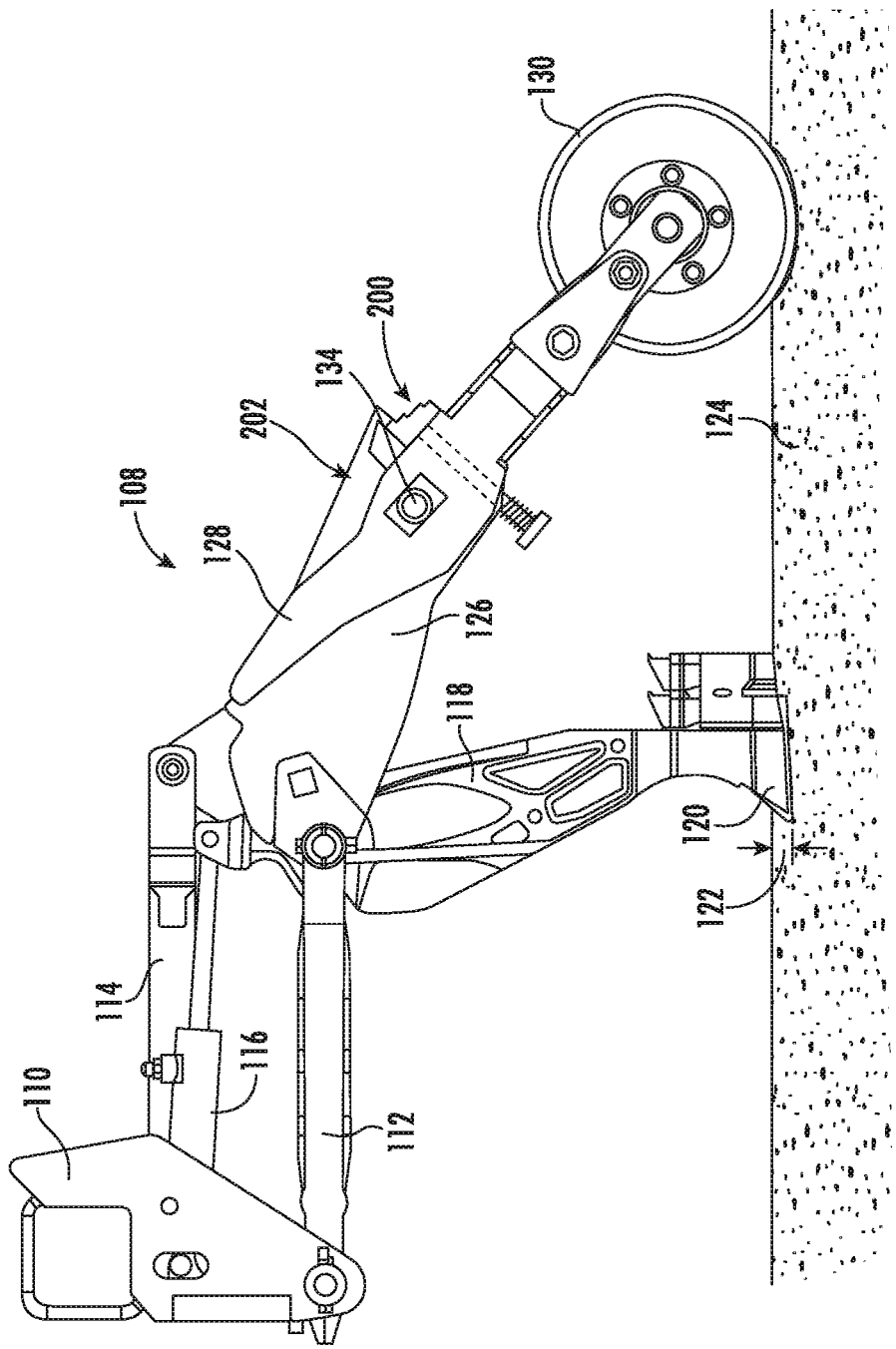
FIG. 11 illustrates a side view of the seed planting unit shown in FIG. 2, particularly illustrating the depth adjustment member positioned relative to the wheel support arm such that the ground engaging tool is disposed at its minimum penetration depth setting.

Referring now to FIGS. 3-11, various views of one embodiment of a seed planting unit (e.g. the unit 108 shown in FIG. 2) are illustrated in accordance with aspects of the present subject matter. Specifically, FIG. 3 illustrates a partial, perspective view of the unit 108 described above with reference to FIG. 2, particularly depicting various components of the unit 108 (e.g., the opener 122 and the packer wheel 132) removed from the drawing for purposes of illustration. FIGS. 4 and 5 illustrate perspective views of a portion of the depth adjustment member 200 shown in FIGS. 2 and 3. FIG. 6 illustrates a partial perspective view of the seed planting unit 108 shown in FIG. 3, particularly illustrating the depth adjustment member 200 partially exploded away from a portion of the wheel support arm 128. FIG. 7 illustrates a side view of the support structure 126 of the seed planting unit 108 shown in FIG. 3, particularly illustrating the depth stop member 202 formed integrally with the support structure 126 and abutting against the depth adjustment member 200. FIGS. 8 and 9 illustrate partial, side views of features for selectively locking the depth adjustment member 200 relative to the wheel support arm 128. Additionally, FIGS. 10 and 11 illustrate differing views of the seed planting unit 108 shown in FIG. 3, particularly illustrating the depth adjustment member 200 positioned at a maximum depth setting corresponding to a deepest penetration depth setting of the opener 120 (FIG. 10) and at a minimum depth setting corresponding to a shallowest penetration depth setting of the opener 120 (FIG. 11).

As indicated above, the seed planting unit 108 may include both a depth adjustment member 200 and a depth stop member 202 to allow the penetration depth setting of the opening 120 to be adjusted, as desired or necessary. As shown in the illustrated embodiment, the depth adjustment member 200 is generally provided in operative association with the wheel support arm 128 of the seed planting unit 108 while the depth stop member 202 is generally provided in operative association with the support structure 126 of the seed planting unit 108. Specifically, as will be described below, the depth adjustment member 200 may be configured to be rotatably or movably coupled to the wheel support arm 128 to allow the relative positioning of the depth adjustment member 200 to be adjusted while the depth stop member 202 may be configured to be fixed relative to the support structure 126 (e.g., by being formed integrally with the support structure 126 or by being rigidly coupled to the support structure 126. However, as will be described below with reference to FIG. 14, the configuration of the depth adjustment components may be reversed, with the depth adjustment member 200 being rotatably or movably coupled to the support structure 126 and the depth stop member 202 being fixed relative to the wheel support arm 128.

As shown in the illustrated embodiment, the depth stop member 202 is generally configured to contact or abut against a portion of a graduated profile defined by the depth adjustment member 200. In general, the depth adjustment member 200 may be configured to be selectively movable relative to the wheel support arm 128 to adjust the relative positioning between the depth adjustment member 200 and the depth stop member 202, thereby varying which portion of the graduated profile the depth stop member 202 is configured to engage and, thus, varying the amount that the wheel support arm 128 is configured to pivot relative to the support structure 126. Specifically, the adjustment of the relative positioning between the depth adjustment member 200 and the depth stop member 202 varies the amount that the wheel support arm 128 is allowed to pivot before coming into contact with the depth stop member 202, which, in turn, varies the vertical positioning of the opener 120 (FIG. 2) relative to the packer wheel 130 (FIG. 2) and, thus, adjusts the penetration depth setting 122 of the opener 120. Additionally, in one embodiment, the depth adjustment member 200 may be configured to be selectively locked or otherwise engaged relative to the wheel support arm 128 to prevent further rotation of the depth adjustment member 200 relative to both the wheel support arm 128 and the depth stop member 202, thereby setting the desired penetration depth for the opener 120.

As particularly shown in FIGS. 4 and 5, the graduated profile (e.g., graduated profile 206) of the depth adjustment member 200 generally corresponds to a plurality of levels 208 formed within or defined along an upper surface (i.e., an abutment portion 204) of the depth adjustment member 200. In one embodiment, the depth adjustment member 200 may define a plurality of adjustment sections 216, each one of the adjustment sections 216 being defined along a different portion of the outer perimeter of the depth adjustment member 200. In such an embodiment, each of the plurality of levels 208 may be defined by a respective one of the plurality of sections 216. In one embodiment, the depth adjustment member 200 may be generally configured to be circular, e.g. as a depth adjustment wheel, where the outer perimeter is defined by an outer circumference having a radius 212 extending from an axis of rotation 214 of the depth adjustment member 200. In such an embodiment, each of the plurality of adjustment sections 216 extends circumferentially around a respective circumferential section of the outer circumference of the depth adjustment member 200. For example, each of the sections 216 is shown in FIG. 4 as extending along a respective arc of the outer circumference, the arc corresponding to a circumferential angle A1 at the radius 212 from the axis of rotation 214 of the depth adjustment member 200.

While the adjustment sections 216 are shown as extending along the same circumferential angle, i.e. circumferential angle A1, this should not be construed as limiting. Instead, the sections 216 may be configured to be defined along differently sized circumferential angles to provide a desired range of incremental levels for adjusting the penetration depth setting 122. Further, while the sections 216 are shown as extending the entire radial distance (i.e. radius 212) between the circumference and the axis of rotation 214, this should also not be construed as limiting. Instead, the radial sections 216 may form only a portion of such radial distance, such as by forming a radial segment.

In some embodiments, as shown in FIG. 5, the graduated profile 206 may be generally spaced apart from a bottom or base surface 218 of the depth adjustment member 200 such that the levels 208 defined by the various adjustment sections 216 are disposed at varying distances relative to the base surface 218. For example, a first level 208A is spaced apart from the base surface 218 by a first distance DA, where the first distance DA generally corresponds to or is associated with a maximum depth setting (FIG. 10) of the seed planting unit. A second level 208E is spaced apart from the base surface 218 by a second distance DE, where the second distance DE corresponds to or is associated with a minimum depth setting (FIG. 11) of the seed planting unit 108.

Additionally, as shown in FIG. 5, the graduated profile 206 of the depth adjustment member 200 may include a series of intermediate levels. In this regard, each of the intermediate levels may be spaced apart from the base surface 218 by a respective larger distance than a respective previous level. For example, a first intermediate level 208B positioned adjacent the first level 208A is spaced apart from the base surface 218 by a first intermediate distance DB, which is larger than the first distance DA. Similarly, a second intermediate level 208C positioned adjacent the first intermediate level 208B is spaced apart from the base surface 218 by a second intermediate distance DC, which is larger than the first intermediate distance DB. Additionally, a third intermediate level 208D positioned between the second intermediate level 208C and the second level 208E is spaced apart from the base surface 218 by a third intermediate distance DD, which is larger than the second intermediate distance DC and smaller than the second distance DE. Thus, the distance between respective, consecutive levels of the plurality of levels 208 and the base surface 218 increases from the first level 208A through the intermediate levels 220 to the second level 208E of the graduated profile 206. In such an embodiment, the graduated profile 206 of the depth adjustment member 200 generally defines the depth adjustment range for the penetration depth of the opener 120.

It should be appreciated that, in some embodiments, the distance between respective, consecutive levels of the plurality of levels 208 and the base surface 218 may be configured to non-linearly increase from the first level 208A through the intermediate levels 220 to the second level 208E of the depth adjustment member 200. With such a non-linear increase, the penetration depth setting 122 may be configured to provide more fine or gradual changes within certain ranges (e.g., shallower ranges) of the opener's penetration depth that may require more precise positioning of the seed within the soil 124 and coarser or larger changes within other ranges (e.g., deeper ranges) of the opener's penetration depth where less precise positioning of the seed within the soil 124 is required. Further, while the graduated profile 206 of the depth adjustment member 200 is shown as only including five levels, this should not be construed as limiting. Instead, the graduated profile 206 may be configured to define any number of levels 208 to provide a desired range of incremental levels for adjusting the penetration depth setting 122.

As indicated above, the depth adjustment member 200 may be configured to be installed relative to or otherwise be supported by the wheel support arm 128 of the seed planting unit 108 such that it may be selectively rotatable or movable relative to the wheel support arm 128. Specifically, as shown in FIGS. 3 and 6, the depth adjustment member 200 may be configured to be coupled to the lower portion 136 of the wheel support arm 128 such that the depth adjustment member 200 may be movable relative to the wheel support arm 128. For example, in one embodiment, the depth adjustment member 200 may include an elongated portion 222 extending from the abutment portion 204 of the adjustment member 200 that is configured to be engaged or received within a slot 224 defined within the lower portion 136 of the wheel support arm 128. Specifically, as shown in FIG. 6, the elongated portion 222 may be configured to extend outwardly from the base surface 218 of the abutment portion 204, opposite the graduated profile 206. For example, the elongated portion 222 may generally form a circular rod or cylinder extending between a first end 226 and a second end 228 along the axis of rotation 214 of the depth adjustment member 200, with the first end 226 of the elongated portion 222 being positioned proximate the base surface 218 of the depth adjustment member 200. It should be appreciated that, in other embodiments, the depth adjustment member 200 may be otherwise configured to be installed relative to or otherwise be supported by the wheel support arm 128 such that it may be selectively rotatable or movable relative to the wheel support arm 128. In such embodiments, the depth adjustment member 200 may axially slide and/or rotate relative to the wheel support arm 128 across a range of positions to thus set the desired penetration depth for the opener 120.

By slidably and/or rotatably coupling the depth adjustment member 200 to the wheel support arm 128, the depth adjustment member 200 may be moved relative to the wheel support arm 128 to a suitable position that allows the depth stop member 202 to abut against the first level 208A of the depth adjustment member 200 when the seed planting unit 108 is located at its working position. As shown in FIG. 10, at such position, the opener 120 may be disposed at its maximum penetration depth setting 122. Similarly, the depth adjustment member 200 may be rotated relative to the wheel support arm 128 to a suitable position that allows the depth stop member 202 to abut against the second level 208E of the depth adjustment member 200 when the seed planting unit 108 is located at its working position. As shown in FIG. 11, at such position, the opener 120 may be disposed at its minimum penetration depth setting 122. Additionally, the depth adjustment member 200 may be rotated relative to the wheel support arm 128 to any other suitable orientation relative to the depth stop member 202 that allows the depth stop member 202 to abut against any of the intermediate levels defined between the first and second levels 208A, 208E.

As indicated above, in several embodiments, the depth stop member 202 may be fixed relative to the support structure 126, such as by being formed integrally with the support structure 126 and/or by being rigidly coupled to the support structure 126. As shown in FIG. 7, in one embodiment, the depth stop member 202 may generally include an extending portion 230 and a contacting portion 232. The extending portion 230 extends generally outwardly from the support structure 126 along a length 240 defined between a proximal end 234 and a distal end 236. The length 240 of the extending portion 230 is configured such that each of the levels 208 may be selectively abutted against by the contacting portion 232 depending on the rotational orientation of the depth adjustment member 200 relative to the stop member 202. Additionally, the contacting portion 232 may generally extend downwardly at the distal end 236 of the extending portion 230 to form an abutment surface 238 configured to contact or otherwise abut against the levels 208. The abutment surface 238 may be configured, as shown in FIG. 7, to be planar such that, when the depth stop member 202 contacts the depth adjustment member 200, the abutment surface 238 is substantially parallel to the adjacent level 208 against which the depth stop member 202 is abutting. However, it should be appreciated that the abutment surface 238 may have any other suitable configuration that allows it to abut against the desired level 208 of the depth adjustment member 200.

Moreover, as indicated above, the support structure 126 may be movable between a working position and an adjustment position. More specifically, when the seed planting unit 108 is lifted (e.g., by cylinder 116) such that the wheel 130 and opener 120 are no longer in engagement or contact with the soil 124, the support structure 126 (and associated depth stop member 200) may rotate into the adjustment position and the wheel support arm 128 may pivot downward into a more vertical orientation relative to the soil 124 such that the depth adjustment member 200 is spaced apart from the depth stop member 202. While the support structure 126 is in the adjustment position, the depth adjustment member 200 may be configured to be slidable or rotatable relative to the wheel support arm 128 to selectively orient the desired adjustment level 208 relative to the depth stop member 202. When the desired position of the depth adjustment member 200 relative to the wheel support arm 128 is reached, the seed planting unit 108 may be lowered such that the support structure 126 rotates into the working position and the wheel 130 again engages the soil 124, causing the lower portion 136 of the wheel support arm 128 to pivot upward until the abutment surface 238 of the depth stop member 202 abuts against the adjacent level 208 of the depth adjustment member 200, thus limiting further rotation of the wheel support arm 128 relative to the support structure 126.

Additionally, in several embodiments, the depth adjustment member 200 may be configured to be locked or otherwise fixed relative to the wheel support arm 128. For example, in one embodiment, the depth adjustment member 200 may be configured to be selectively engaged with a portion of the wheel support arm 128 to maintain a rotational position of the depth adjustment member 200 relative to the depth stop member 202. Specifically, in one embodiment, the depth adjustment member 200 may be rotationally fixed to the wheel support arm 128 via one or more engagement elements 240 configured to be provided in interlocking engagement with corresponding engagement elements 242 of the wheel support arm 128. As shown in FIG. 6, the depth adjustment member 200 may include a plurality of axially outwardly extending engagement elements, such as engagement teeth 240 extending axially outwardly from the base surface 218. The engagement teeth 240 may be configured to engage or mesh with corresponding engagement elements 242 of the wheel support arm 128, with the number of pairs of engagement teeth 240 and corresponding engagement elements 242 generally corresponding to the number of levels 208 defined by the abutment portion 204 of the depth adjustment member 200.

In one embodiment, as shown schematically in FIG. 4, the engagement teeth 240 are configured to be evenly spaced apart from one another along the circumferential direction by a circumferential angle that generally corresponds to the circumferential angle defined by each of the sections 216 (e.g., by the circumferential angle A1). The engagement teeth 240 may further be configured such that each of the engagement teeth 240 is radially spaced apart from the axis of rotation 214 by a radial distance R1. Moreover, as is particularly illustrated in FIG. 6, the recesses 242 may defined relative to an outer surface of the wheel support arm 128 (i.e., an upper surface 244) so as to be spaced apart in the same manner as the engagement teeth 240 from the axis of rotation 214, thereby allowing the teeth 240 to be received within the recesses 242 when it is desired to lock the rotational orientation of the depth adjustment member 200 relative to the wheel support arm 128.

It should be appreciated that, in alternative embodiments, the first and second engagement elements 240, 242 may have any other suitable configuration and/or may correspond to any other suitable elements and/or features that allow the disclosed depth adjustment member 200 to generally function as described herein. For instance, in another embodiment, the first and second engagement elements 240, 242 may both be configured as axially outwardly extending elements from their respective surfaces 218, 244 such that the first engagement elements 240 are configured to be received between the second engagement elements 242 to prevent rotation of the depth adjustment member 200 relative to the wheel support arm 128.

Additionally, in one embodiment, the depth adjustment member 200 may be axially biased such that the abutment portion 204 is configured to be continuously biased towards the wheel support arm 128. As shown in FIG. 8, the elongated portion 222 of the depth adjustment member 200 may include a flanged portion 246 proximate its second end 228. The flanged portion 246 may be disposed proximate a side (i.e., a lower surface 248) of the wheel support arm 128 opposite the abutment portion 204 of the depth adjustment member 200. A biasing element, such as a spring 250, may be disposed around the elongated portion 222 and may be held between the flanged portion 246 and the lower surface 248 of the wheel support arm 128. The spring 250 may provide a biasing force that biases the flanged portion 246 away from the lower surface 248 of the wheel support arm 128 such that the abutment portion 204 of the depth adjustment member 200 is biased towards the upper surface 244 of the wheel support arm 128. Thus, the engagement teeth 240 may be configured to be normally biased towards the recesses 242 such that when the engagement teeth 240 are rotationally aligned with the recesses 242, the engagement teeth 240 may be received within the recesses 242. If the engagement teeth 240 are not rotationally aligned with the recesses 242 when the abutment portion 204 is biased against the upper surface 244 of the wheel support arm 128, the depth adjustment member 200 may further be rotated until the engagement teeth 240 are received within the recesses 242. Additionally, when the biasing force of the spring 250 is overcome (e.g., by the operator pushing or pulling on the depth adjustment member 202), the engagement teeth 240 may be removed from the recesses 242 such that the depth adjustment member 200 may be rotated relative to the wheel support arm 128.

It should be appreciated that, in alternative embodiments, the biasing element 250 may have any other suitable configuration and/or may correspond to any other suitable elements and/or features that allow the disclosed depth adjustment member 200 to generally function as described herein.

In another embodiment, the depth adjustment member 200 may be selectively axially locked such that the bottom surface 218 of the abutment portion 204 is configured to be axially locked against the upper surface 244 of the wheel support arm 128. As shown in FIG. 9, the elongated portion 222 of the depth adjustment member 200 may be configured to be selectively engaged with a locking element 252 such that the locking element 252 limits or prevents axial movement of the elongated portion 222 within the slot 224. The locking element 252 may be a threaded fastener, such as a threaded nut, with at least a portion of the elongated portion 222 being correspondingly threaded. Once a desired rotational position of the depth adjustment member 200 has been established and the first and engagement elements 240, 242 are engaged, the threaded nut 252 may be threaded onto and/or tightened along the elongated portion 222 until the threaded nut 252 abuts against the lower surface 248 of the wheel support arm 128, thus essentially preventing or eliminating axial movement of the elongated portion 222 within the slot 224. With the axial movement of the elongated portion 222 restricted, the engagement elements 240, 242 may not be disengaged in a manner that would allow the depth adjustment member 200 to be rotated relative to the wheel support arm 128 until the threaded nut 252 is again loosened along or removed from the elongated portion 222. It should be appreciated that the locking element 252 may be otherwise configured to allow the elongated portion 222 of the depth adjustment member 200 to be axially locked relative to the wheel support arm 128.

Figure 12:
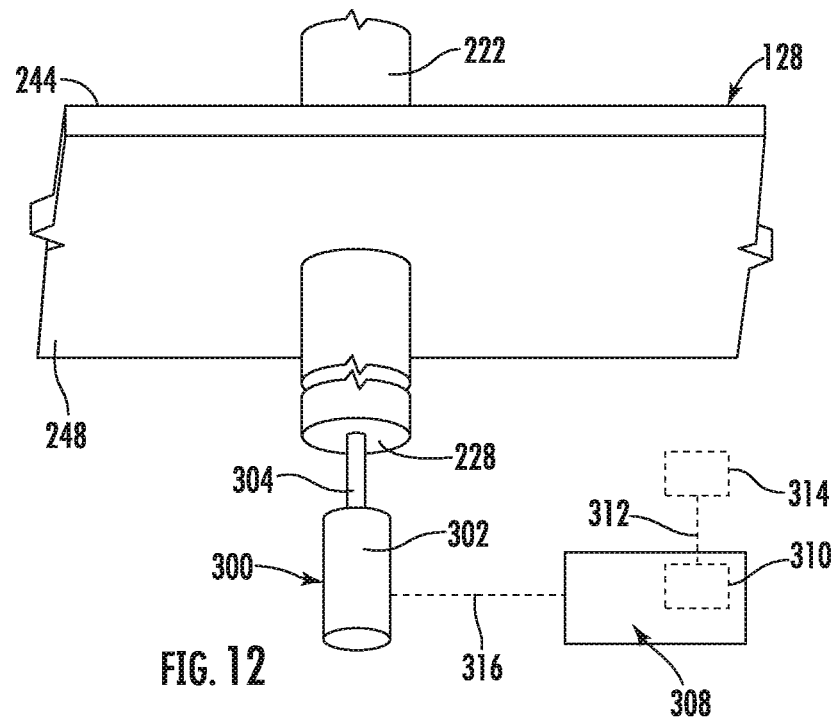
FIG. 12 illustrates a partial, perspective view of another embodiment of the depth adjustment member of the seed planting unit shown in FIG. 2 in accordance with aspects of the present subject matter, particularly illustrating the seed planting unit including an actuator configured to adjust the position of the depth adjustment member relative to the depth stop member.
Figure 13:
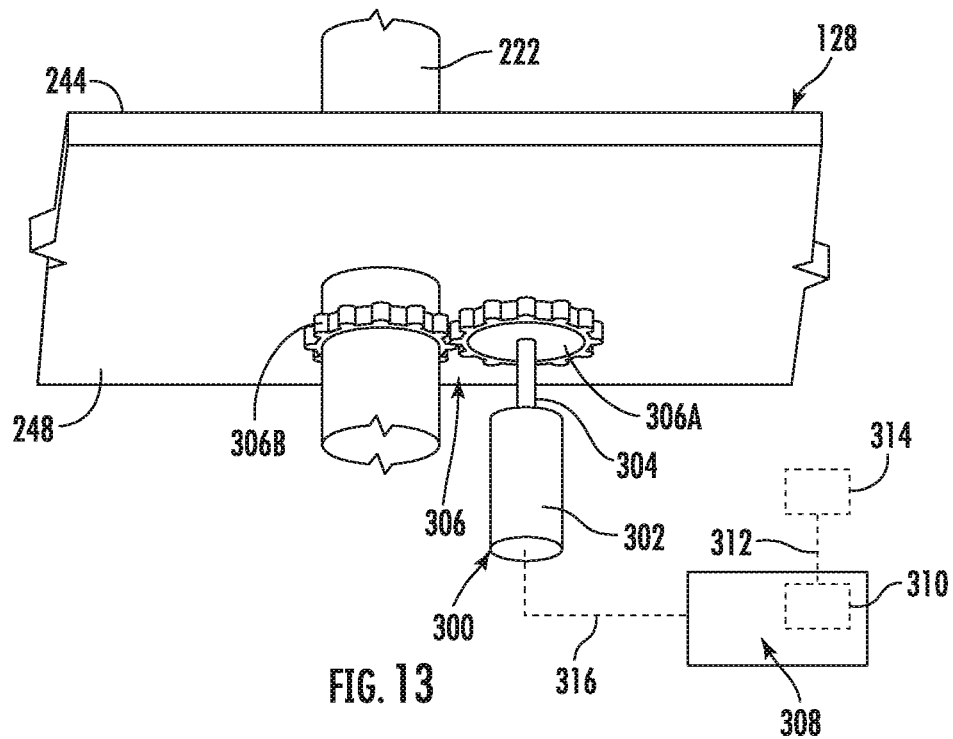
FIG. 13 illustrates a partial, perspective view of another embodiment of the depth adjustment member of the seed planting unit shown in FIG. 2 in accordance with aspects of the present subject matter, particularly illustrating the seed planting unit including an actuator.

Referring now to FIGS. 12 and 13, a partial perspective view of a further embodiment of the seed planting unit 108 described above is illustrated in accordance with aspects of the present invention. Specifically, FIGS. 12 and 13 illustrate alternative embodiments of the seed planting unit 108 having the depth adjustment member 200 and an actuator 300 configured for automatic adjustment of the penetration depth setting 122 of the opener 120. As discussed in detail below, the depth adjustment member 200 is configured to be rotatable or otherwise movable by the actuator 300 relative to the wheel support arm 128 when it is desired to adjust the penetration depth setting 122 of the opener 120.

In the embodiments illustrated in FIGS. 12 and 13, the actuator 300 includes a motor 302, with the motor 302 being configured to rotate a shaft 304. In the embodiment shown in FIG. 12, the elongated portion 222 of the depth adjustment member 200 may be connected to or form part of the shaft 304. Such a configuration provides for direct driving of the elongated portion 222 by the actuator 300. As such, rotation of the shaft 304 by the motor 302 causes the depth adjustment member 200 to rotate relative to the wheel support arm 128 such that the depth stop member 202 may abut against a different level 208 of the abutment portion 204 when the support structure 126 is in the working position to adjust the penetration depth setting of the opener 120.

In one embodiment, as shown in FIG. 13, the actuator 300 is connected through a gear assembly 306 having at least a first gear 306A and a second gear 306B. The first gear 306A may be rotationally fixed to the shaft 304 and the second gear 306B may be rotationally fixed to the elongated portion 222 of the depth adjustment member 200, with the second gear 306B meshing with the first gear 306A. Such a gear assembly 306 may allow for different gear ratios between the input at the shaft 304 and the output at the elongated portion 222. As the shaft 304 rotates, the depth adjustment member 200 rotates relative to the wheel support arm 128 such that the depth stop member 202 may abut against a different level 208 of the abutment portion 204 when the support structure 126 is in the working position to adjust the penetration depth setting of the opener 120. It should be appreciated that, in alternative embodiments, the depth adjustment member 200 may be actuated by the motor 302 in any other suitable manner, such as by, e.g., a belt extending around the circumference of the depth adjustment member.

In several embodiments, the operation of the actuator 300 may be electronically controlled via a controller 308, such as any suitable processor-based device(s) having a processor and a memory configured to store computer-readable instructions that can be executed by the processor. In such embodiments, the controller 308 may be communicatively coupled to the motor 302 to control the operational speed and direction of the motor 302, and thus the rotation of the depth adjustment member 200 relative to the adjacent wheel support arm 128.

Moreover, the controller 308 may also include a communications interface 310 to provide a means for the controller 308 to communicate with any of the various other system components of the agricultural implement and/or any components of the work vehicle towing the implement. For instance, one or more communicative links 312 may be provided between the communications interface 310 and a user interface 314 to allow the controller to receive input signals from the user interface 314. The user interface 314 may be configured to receive information from the operator, such as, but not limited to, information regarding the desired penetration depth setting for the opener 120, and to send input signals to the communications interface 310 via the communicative links 312. Similarly, one or more communicative interfaces 316 may be provided between the communications interface 310 and the actuator(s) 300 (and/or a related component configured to control the operation of the actuator(s) 300) to allow the operation of the actuator(s) 300 to be controlled by the controller 308.

By configuring the seed planting unit 108 to have an electronically controlled actuator, such as the actuator 300 described above with reference to FIGS. 12 and 13, the penetration depth of the seed planting unit 108 may be adjusted automatically (i.e., without manual manipulation of the depth adjustment member 200) when the support structure 126 is in the adjustment position. As such, the time required to adjust the penetration depth may be significantly reduced, thus increasing seeding efficiency. For example, in instances in which each seed planting unit 108 includes an associated actuator 300, the operator may provide an input (via the user interface 314) instructing the controller 308 to control the operation of the various actuators 300 such that the penetration depth setting for each opener 120 of the implement is adjusted to a given operator-selected setting. Additionally, the depth adjustment member 200 may be locked into a rotational position relative to the wheel support arm 128 by use of the actuator 300 alone, thus reducing material costs and the complexity of the seed planting unit 108.

Figure 14:
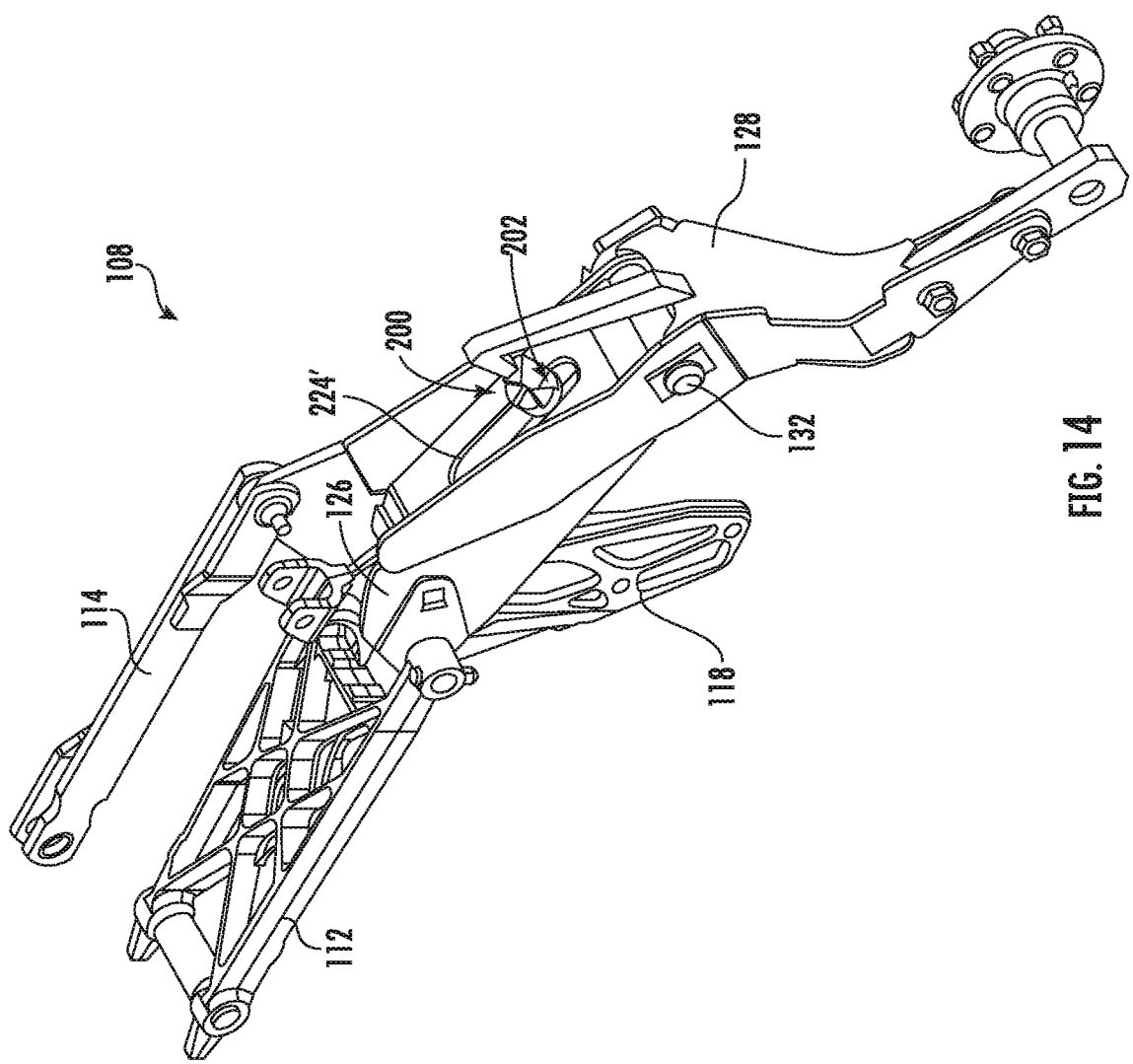
FIG. 14 illustrates a partial, perspective view of another embodiment of a seed planting unit suitable for use within the agricultural implement shown in FIG. 1, particularly illustrating aspects of a support structure, a wheel support arm, a depth stop member, and a depth adjustment member of the seed planting unit in accordance with aspects of the present subject matter.

Referring now to FIG. 14, a partial, perspective view of another embodiment of a seed planting unit 108 suitable for use within the agricultural implement shown in FIG. 1 is illustrated in accordance with aspects of the present subject matter. Specifically, FIG. 14 illustrates an alternative embodiment of the seed planting unit 108 having a support structure 126', a wheel support arm 128', an adjustment member 200', and a depth stop member 202'. As discussed in greater detail below, the depth adjustment member 200' is configured to be supported by or otherwise installed relative to the support structure 126' of the seed planting unit 108 such that it may be selectively rotatable relative to the support structure 126' when it is desired to adjust the penetration depth setting 122 of the opener 120. Further, the depth stop member 202' may be provided in operative association with the wheel support arm 128' to selectively abut against the depth adjustment member 200', thereby setting the desired penetration depth for the opener 120.

In the illustrated embodiment, both the support structure 126' and the wheel support arm 128' are generally configured the same as or similar to the support structure 126 and the wheel support arm 128, respectively, described above with reference to the embodiments shown in FIGS. 3-13. However, unlike the support structure 126 described above that includes the depth stop member 202 extending therefrom, the support structure 126' instead includes a slot 224' (e.g., configured the same as or similar to the slot 224 of the wheel support arm 128 described above) configured to allow the depth adjustment member 200' to be rotatably coupled to the support structure 126'. In such an embodiment, the depth stop member 202' may, instead, be provided in operative association with the wheel support arm 128'. For example, as shown in FIG. 14, the depth stop member 202' may be formed integrally with or rigidly coupled to a portion of the wheel support arm 128' such that the depth stop member 202' extends outwardly therefrom in the direction of the location at which the depth adjustment member 200' is installed on the support structure 126'. As such, the depth adjustment member 200' may be moved relative to the support structure 126' to a suitable position that allows the depth stop member 202' to abut against a given level of the depth adjustment member 200' to set the desired penetration depth setting for the open 120. For example, the depth adjustment member 200' may be moved relative to the support structure 126' to a suitable position that allows the depth stop member 202' to abut against the shortest level of the depth adjustment member 200' (e.g., first level 208A shown in FIG. 5), thereby allowing the opener 120 to be disposed at its maximum penetration depth setting 122. Similarly, the depth adjustment member 200' may be moved relative to the support structure 126' to a suitable position that allows the depth stop member 202' to abut against the tallest level of the depth adjustment member 200' (e.g., the second level 208E shown in FIG. 5), thereby allowing the opener 120 to be disposed at its minimum penetration depth setting 122.

By configuring the seed planting unit 108 to have the relative positioning of the depth adjustment member 200' and the depth stop member 202' described above with reference to FIG. 14, the penetration depth of the seed planting unit 108 may be adjusted at a different position along the seed planting unit 108, thus providing more locations for the user to access the depth adjustment member 200' to adjust the penetration depth setting, which may improve the ergonomics or access for such an adjustment. In such a way, the time or maneuvering difficulty for adjusting the penetration depth may be reduced significantly, thus increasing seeding efficiency.

Figure 15:
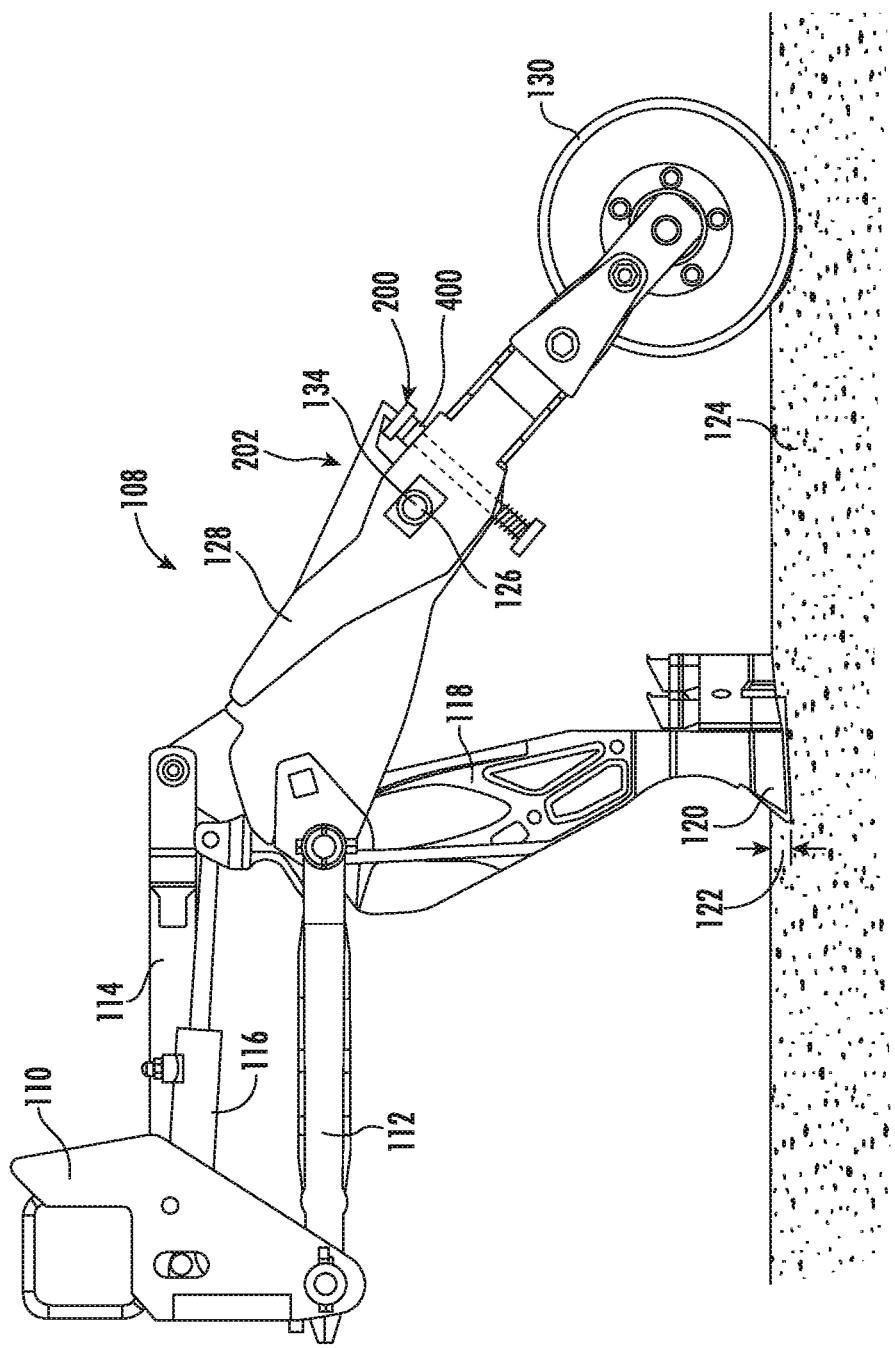
FIG. 15 illustrates a side view of another embodiment of a seed planting unit suitable for use within the agricultural implement shown in FIG. 1 in accordance with aspects of the present subject matter, particularly illustrating the seed planting unit including a depth stop member, an associated depth adjustment member, and depth adjustment attachments configured for adjusting the penetration depth setting of a ground engaging tool of the unit.
Figure 16:
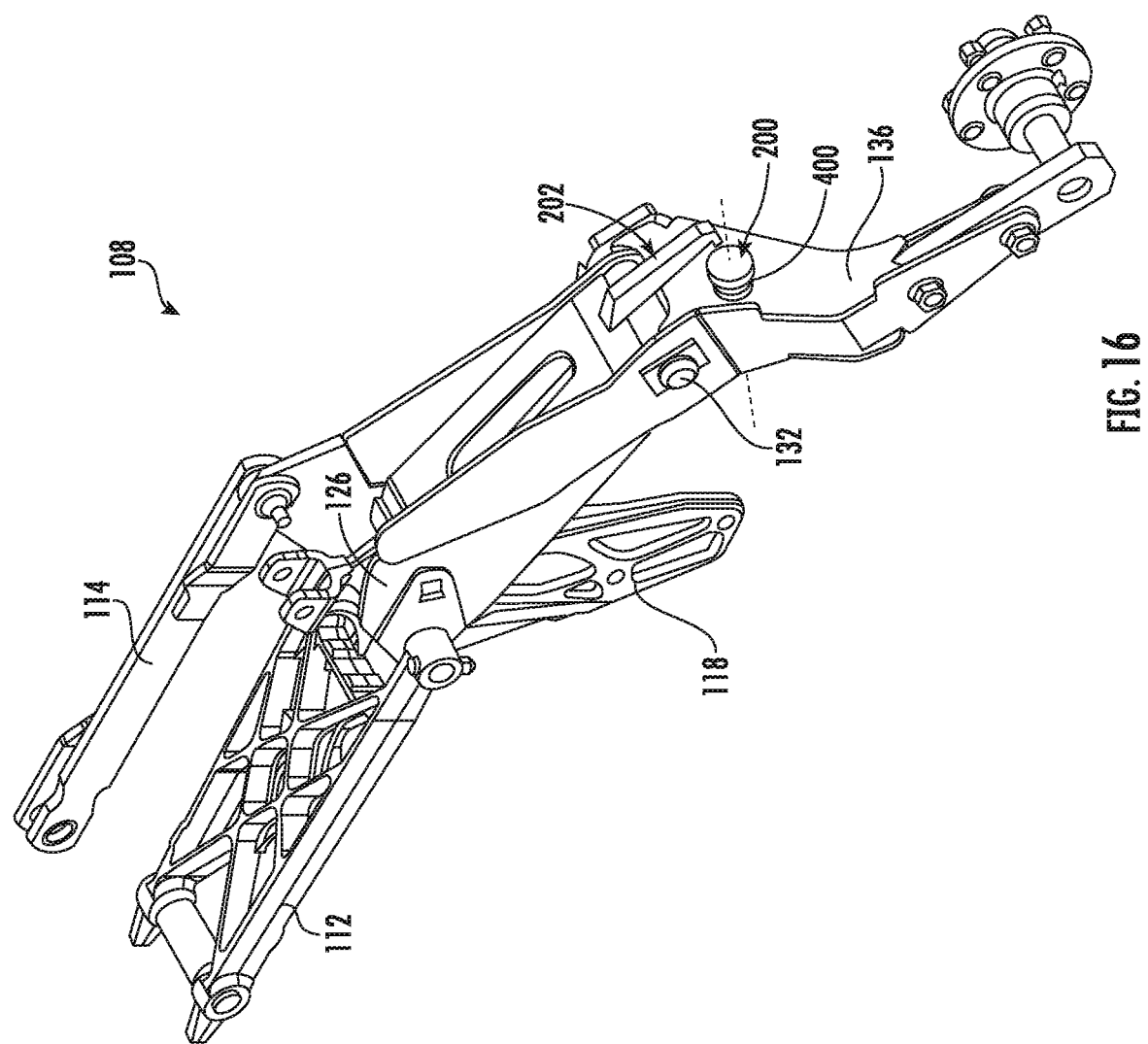
FIG. 16 illustrates a partial, perspective view of the seed planting unit shown in FIG. 15, with various components of the unit, including a packer wheel and a portion of the ground engaging tool, removed for purposes of illustration, particularly illustrating aspects of a support structure, a wheel support arm, the depth stop member, the depth adjustment member and depth adjustment attachments of the seed planting unit in accordance with aspects of the present subject matter.
Figure 17:
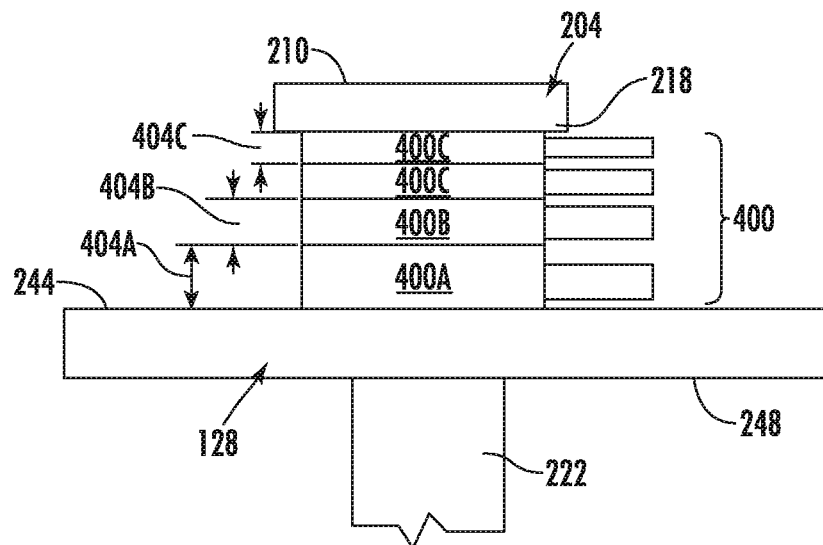
FIG. 17 illustrates a partial, side view of the depth adjustment member as installed relative to the wheel support arm of the seed planting unit shown in FIG. 16 in accordance with aspects of the present subject matter, particularly illustrating the depth adjustment attachments coupled to the depth adjustment member.

Referring now to FIGS. 15-17, an additional or alternative embodiment of the seed planting unit 108 suitable for use within the agricultural implement shown in FIG. 1 is illustrated in accordance with aspects of the present subject matter. Specifically, FIG. 15 illustrates a side view of the seed planting unit 108 having at least one spacer element 400. As discussed in detail below, the depth adjustment member 200 is configured to be selectively movable relative to the wheel support arm 128 when it is desired to adjust the penetration depth setting 122 of the opener 120. Further, the depth adjustment member 200 may be configured to be selectively locked relative to the wheel support arm 128 to prevent further relative movement of the depth adjustment member 200, thereby setting the desired penetration depth for the opener 120.

In the illustrated embodiment, the abutment portion 204 of the depth adjustment member 200 may or may not include the graduated profile 206 as described above with reference to FIGS. 3-13. For example, as shown in FIGS. 15-17, the abutment portion 204 may instead be planar. As such, the penetration depth of the opener 120 may instead be adjusted by spacing the abutment portion 204 axially apart from the wheel support arm 128 such that the base surface 218 is no longer in axial contact with the wheel support arm 128. This is accomplished, as shown in FIGS. 15-17, by adding one or more spacer elements 400 between the base surface 218 of the abutment portion 204 and the upper surface 244 of the wheel support arm 128.

Each spacer element 400 may be receivable around the elongated portion 222 of the depth adjustment member 200. For example, each spacer element 400 may have a spacing portion 402 that is configured to be at least partially received around the elongated portion 222. The spacing portion 402 of each spacer element 400 may have a thickness parallel to the axis of rotation 214 of the elongated portion 222. It should be appreciated that, in some embodiments, as shown in FIG. 17, the thickness of each spacing portion 402 may be configured to be different, with the spacer elements 400 being stackable along the elongated portion 222 to provide more adjustment increments of the opener's penetration depth for more precise positioning of the seed within the soil 124. For example, a first spacer element 400A has a thickness 404A, a second spacer element 400B has a thickness 404B that is configured to be less than the thickness 404A, and third spacer elements 400C each have a thickness 404C that is less than the thickness 404B. Alternatively, the spacing portion 402 of each spacer element 400 may have an equal thickness. Further, while only four spacer elements 400 are shown, this should not be construed as limiting. Instead, any number of spacer elements 400 may be used to provide a desired penetration depth range for adjusting the penetration depth setting 122.

Figure 18:
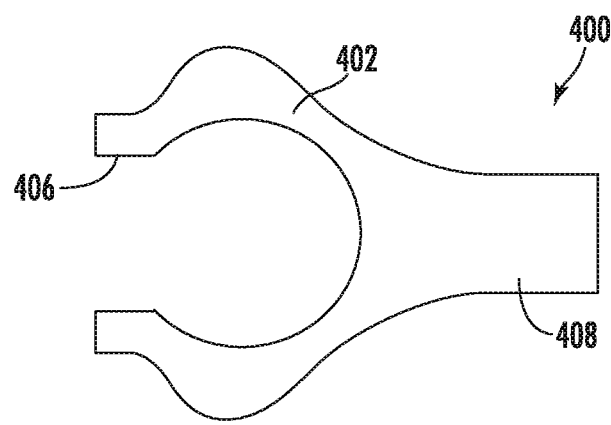
FIG. 18 illustrates a top view of one embodiment of one of the depth adjustment attachments shown in FIG. 17 in accordance with aspects of the present subject matter.

As is particularly shown in FIG. 18, in one embodiment, the spacing portion 402 may include an opening 406 for installing the spacer elements 400 around the elongated portion 222. In one embodiment, the spacing portion 402 may be formed out of a semi-flexible material such that the spacing portion 402 may be configured to fit tightly around at least a portion of the elongated portion 222 and such that the spacer element 400 may not be accidentally removed from around the elongated portion 22. Each spacer element 400 may further include a handle 408 extending radially outwardly from the spacing portion 402. The handle 408 may be configured to allow the operator to effectively grasp the spacer element 400, thereby permitting the operator to manually adjust the position of the abutment portion 202 relative to the wheel support arm 128. An operator may install each spacer element 400 on the elongated portion 222 by first pulling the base surface 218 of the abutment portion 202 of the depth adjustment member 200 away from the wheel support arm 128 (e.g., against the bias provided by an associating biasing element, such as the spring 250 shown in FIG. 8). The user may then add one or more spacer elements 400 until the desired penetration depth setting 122 of the opener 120 is attainable when the operator allows the abutment portion 202 to again be axially biased towards or locked relative to the wheel support arm 128.

By configuring the seed planting unit 108 to have spacer elements, such as the one or more spacer elements 400 described above with reference to FIGS. 15-18, the penetration depth of the seed planting unit 108 may be easily and quickly be adjusted when the support structure 126 is in the adjustment position using relatively simple parts. In such manner, the time and complexity required to adjust the penetration depth may be significantly reduced, thus increasing seeding efficiency and reducing costs. Additionally, it should be appreciated that, in an embodiment where the abutment portion 204 includes the graduated profile 206, the graduated profile may be further spaced apart from the wheel support arm 128 by adding one or more of the spacer elements 400. As such, the penetration depth of the opener 120 may have an extended depth adjustment range, thus allowing for a greater potential change between the minimum and maximum penetration depth setting of the opener 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seed planting unit of an agricultural implement, the seed planting unit comprising:
    a ground engaging tool without a gauge wheel positioned therebeside and configured to penetrate a soil surface;
    a support structure configured to support the ground engaging tool;
    a wheel support arm pivotally coupled to and positioned behind the support structure, the wheel support arm including an upper portion and a lower portion;
    a wheel rotatably supported by the lower portion of the wheel support arm, the wheel configured to contact the soil surface a distance behind the ground engaging tool to define a penetration depth setting for the ground engaging tool relative to the soil surface;
    a depth stop member provided in operative association with one of the support structure or the wheel support arm; and
    a depth adjustment member having a base surface and defining a plurality of levels disposed at varying distances relative to the base surface,
    wherein the depth stop member is configured to abut against a selected level of the plurality of levels when the wheel is contacting the soil surface to set the penetration depth setting for the ground engaging tool, and
    wherein the depth adjustment member is configured to be selectively rotated relative to the other of the support structure or the wheel support arm to position the selected level for abutment with the depth stop member.

2. The seed planting unit of claim 1, wherein the depth adjustment member includes a plurality of adjustment sections positioned around an outer perimeter of the depth adjustment member, each of the plurality of levels being defined by a respective adjustment section of the plurality of adjustment sections.

3. The seed planting unit of claim 2, wherein the depth adjustment member is configured as a depth adjustment wheel such that the outer perimeter is defined by an outer circumference of the depth adjustment member, each of the plurality of adjustment sections extending circumferentially around a respective circumferential section of the outer circumference of the depth adjustment member.

4. The seed planting unit of claim 1, wherein:
    a first level of the plurality of levels is spaced apart from the base surface by a first distance associated with a maximum depth setting for the ground engaging tool, and
    a second level of the plurality of levels is spaced apart from the base surface by a second distance associated with a minimum depth setting for the ground engaging tool.

5. The seed planting unit of claim 4, wherein the plurality of levels further comprises a plurality of intermediate levels, each successive intermediate level of the plurality of intermediate levels from adjacent to the first level to adjacent to the second level being spaced apart from the base surface by a respective larger distance than a respective previous intermediate level of the plurality of intermediate levels.

6. The seed planting unit of claim 1, wherein the depth adjustment member is configured to be selectively engaged with a portion of the other of the support structure or the wheel support arm to maintain a rotational position of the depth adjustment member relative to the depth stop member, and wherein abutment of the depth stop member against the depth adjustment member simultaneously positions both the support structure and the wheel support arm.

7. The seed planting unit of claim 6, further comprising a biasing member configured to apply a biasing force against the depth adjustment member to bias the depth adjustment member into engagement with the portion of the other of the support structure or the wheel support arm such that the depth adjustment member must be moved against the biasing force of the biasing member to disengage the depth adjustment member from the portion of the other of the support structure or the wheel support arm to rotate the depth adjustment member.

8. The seed planting unit of claim 6, further comprising a locking element, the locking element configured to be selectively engaged with an elongated portion of the depth adjustment member configured to extend through a slot defined by the other of the support structure of wheel support arm, such that the locking element prevents axial movement of the depth adjustment member to keep the depth adjustment member in engagement with the portion of the other of the support structure or the wheel support arm.

9. The seed planting unit of claim 1, further comprising an actuator coupled to the depth adjustment member, the actuator being configured to selectively rotate the depth adjustment member relative to the other of the support structure or the wheel support arm to position the selected level for abutment with the depth stop member.

10. The seed planting unit of claim 1, wherein the depth adjustment member includes an elongated portion configured to extend through a slot defined by the other of the support structure or the wheel support arm.

* * * * *